United States Patent [19]
Bowman

[11] 3,789,127
[45] Jan. 29, 1974

[54] ARC FURNACES

[75] Inventor: Brian Bowman, Geneva, Switzerland

[73] Assignee: British Steel Corporation, London, England

[22] Filed: Jan. 5, 1973

[21] Appl. No.: 321,273

[30] Foreign Application Priority Data
Jan. 18, 1972 Great Britain...................... 2421/72

[52] U.S. Cl. ........................................ 13/12, 13/10
[51] Int. Cl. ............................................ F27d 11/10
[58] Field of Search............................... 13/9, 12, 10

[56] References Cited
UNITED STATES PATENTS

| | | |
|---|---|---|
| 2,789,152 | 4/1957 | Ham et al. ............................ 13/9 X |
| 2,448,886 | 9/1948 | Hopkins.................................. 13/9 |
| 2,789,150 | 4/1957 | Clough et al. ......................... 13/9 X |
| 3,180,916 | 4/1965 | Menegoz et al. ........................ 13/9 |

Primary Examiner—Roy N. Envall, Jr.
Attorney, Agent, or Firm—Bacon & Thomas

[57] ABSTRACT

An electric arc furnace adapted to be powered by direct current includes a bottom electrode of one polarity (positive) mounted in the vessel for contact with the charge and three electrodes of negative polarity depending into the vessel from above. The arcs from the electrodes migrate inwardly which is the opposite of the case with a.c. thus reducing erosion of the furnace walls by concentrating the heat source in the centre. The bottom electrode design is such as to enable the furnace to be tapped whilst maintaining a reservoir of metal for the succeeding charge.

7 Claims, 6 Drawing Figures

ARC FURNACES

This invention relates to arc furnaces and more particularly relates to d.c. arc furnaces for refining metal e.g., melting and refining steel scrap.

The present invention comprises a direct-arc furnace adapted to be powered by direct current and including at least one electrode of one polarity mounted in the refining vessel for contact with the charge and a plurality of electrodes of the opposite polarity dependent into the vessel above the charge.

Preferably, the latter electrodes are symmetrically disposed around a circular path concentric with the vessel walls and are all connected to the negative source of polarity, functioning as cathodes. The vessel electrode (anode) may be constituted by a reservoir of the metal refined located in the base or hearth of the vessel with an elongated fillet or plug extending from it for contact with the positive source of supply. During melting or refining the reservoir will melt but contact with the bus bar will always be maintained through the solid/liquid interface thus formed in this electrode.

The disposition and design of the vessel electrode is such that the molten reservoir is not completely evacuated during tapping so that the necessary contact is available for the succeeding charge.

A d.c powered arc furnace in accordance with this invention results in a more stable and uniform arc than is the case with a.c. since the dependent electrodes operate continuously as cathodes and not alternately as cathode and anode, accordingly consumption of the (graphite) electrodes is less. Operation is also quieter than with a.c. furnaces of comparable rating. More significant however is the reduction in erosion of the refractory lined walls of the furnace by reason of the arcs from the multiple electrodes migrating inwardly towards the centre of the furnace instead of migrating outwardly towards the walls as is the case with a.c. Thus substantial savings in operating costs may be achieved.

In order that the invention may be fully understood one embodiment thereof will now be described, by way of example, with reference to the accompanying drawings in which:

FIGS. 4a and 6b illustrate the vessel electrode disposition during tapping and charging, respectively, viewed in the direction A in FIG. 3.

Figure 1:
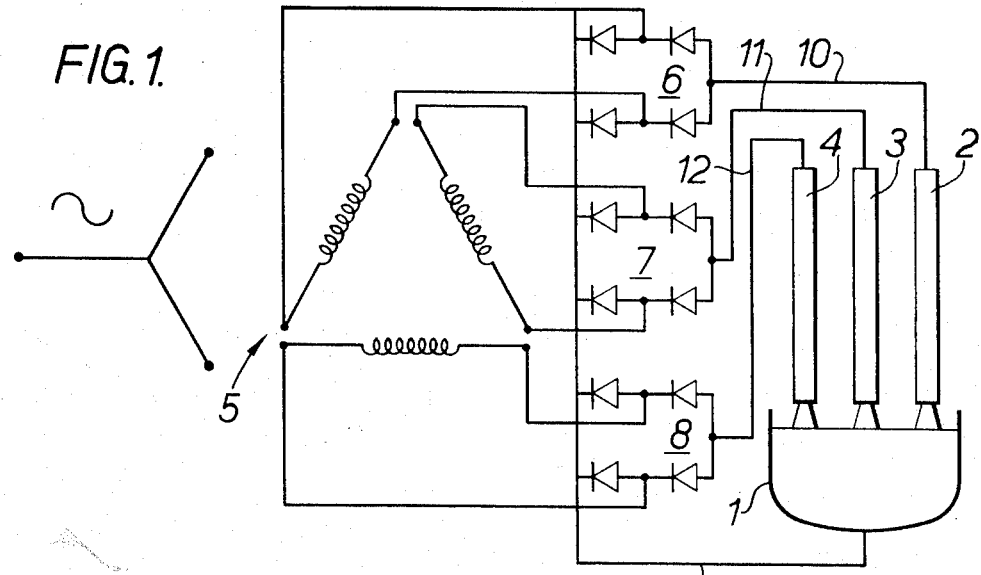
FIG. 1 illustrates a schematic circuit diagram of an arc furnace according to this invention together with the vessel and the electrodes.

Referring now to FIG. 1 the arc furnace comprises a vessel 1 and three dependent graphite electrodes 2,3,4 extending through a roof (not shown).. The power supply for the furnace is derived from a star/delta-connected transformer 5, the secondary windings of which separately apply an appropriate phase to full-wave rectifier banks 6,7,8 comprising silicon rectifiers.

The positive outputs from these banks are commoned and coupled via a lead or bus bar 9 to an electrode in the vessel which is in contact with the melt, whilst the negative connections are separately coupled via leads or bus bars 10, 11, 12 to the electrodes 2,3,4 respectively.

With this form of coupling the arc voltage is increased by $\sqrt{3}$ over its a.c. value whilst the current is decreased by this amount — the same power and MVA obtains in each case.

One of the more significant advantages of d.c. over a.c. in accordance with this invention is, as mentioned above, the fact that whereas a.c. arcs from multiple electrodes migrate outwardly from the electrode tips (commonly known as 'blow-out') d.c. arcs migrate inwardly by reason of the electro-magnetic field set up thus the power input to the melt is concentrated in the centre of the furnace. This aspect is shown in FIGS. 2a and 2b.

Figure 2A:
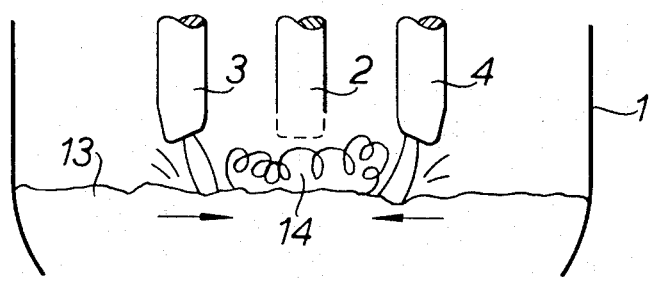
FIGS. 2a and 2b illustrate the action of a d.c arc in elevation and plan view respectively.
Figure 2B:
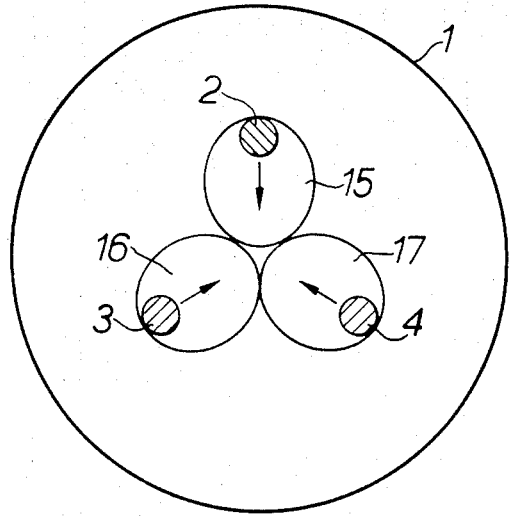

More particularly FIG. 2a shows the electrodes disposed above the molten bath (13) in elevation from which it can be seen that the slag 14 on the surface of the melt is to a large degree blown to the centre of the furnace e.g., away from the refractory lining on the furnace walls thus reducing 'hot spot' erosion arising from radiation/convection from the flames and/or slag attack. This is illustrated in plan in FIG. 2b, the appropriate lobes of power dissipation by the arcs being identified by numerals 15,16 and 17.

The three electrodes are symmetrically arranged around a circle concentric with the walls of the furnace and, as compared with a.c. operation, the pitch circle diameter on which these electrodes lie is preferably greater than the a.c. case in order to ensure that scrap will be adequately melted off the banks adjacent the walls of the vessel.

The vessel (positive) electrode is sited in its base or hearth and provides a liquid/solid steel connection.

Figure 3:
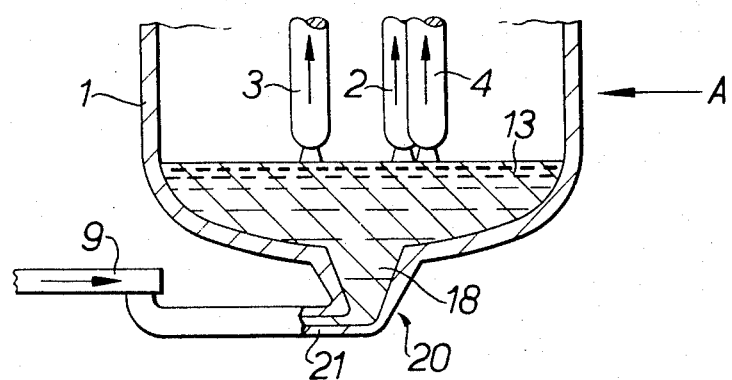
FIG. 3 illustrates one form of vessel electrode

Referring now to FIG. 3 the electrode is constituted by a steel 'reservoir' 18 and a fillet or elongated plug 19 the extremity of which is water-cooled, contained in a specially designed receptacle 20 in the base. This may in fact be a castable refractory, it being understood that in a practical furnace the whole of this base protrusion could well be housed in refractory brickwork. The common bus bar 9 is secured to the remote end of a leg 21 of this receptacle 20. The plug, a solid steel member, is preformed with the electrode itself, e.g., by a casting process, and machined to ensure good contact with the bus bar.

The leg 21 extends in the same direction as the bus bar and the furnace tilts about an axis substantially parallel with these members.

With this arrangement then, when a hot metal and scrap charge is introduced this makes contact with the vessel electrode and the charge is melted in the normal way as with a.c. Any melting of the metal reservoir in the vessel electrode is of no consequence since contact is still maintained through the resulting solid/liquid interface. In practice, with the bath molten the temperature at the remote end of the plug 19 may be only of the order of 200°/300° C so that the bus bar is unaffected by this contact and, by the same token, no impurities are fed back to contaminate the melt.

Figure 4A:
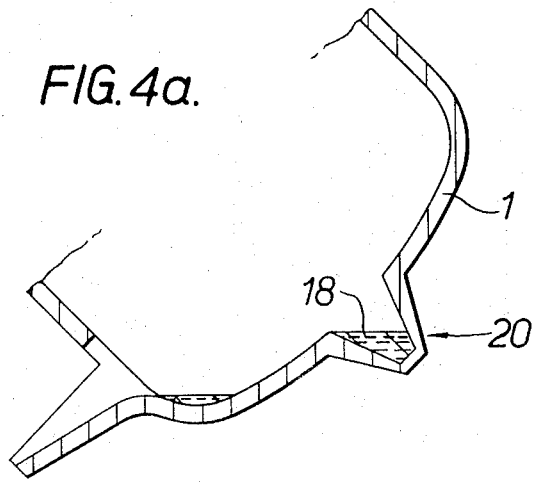
Figure 4B:
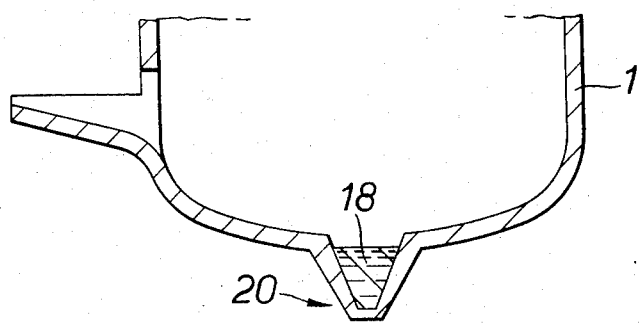

When the charge is ready for tapping the vessel is tilted as shown in FIG. 4a but, by reason of the disposition of the reservoir, it will be seen that it is not completely evacuated of molten metal. Thus, when the vessel is ready for charging again (FIG. 4b) a solid or liquid mass of steel is still within the reservoir so that contact may readily be established for the following heat.

Although this invention has been described with reference to the particular embodiments illustrated it is to be understood that various modifications and alterations may be made without departing from the scope of this invention. For example the star/delta power input arrangement has merely been illustrated as an expedient since existing a.c. transformers for arc furnaces are conventionally of this type. A star connected secondary could equally well be used in which case the d.c. voltages and currents would be at the same level as for an a.c. furnace. Compared with a delta secondary then, the star secondary would not reduce electrode consuption to the same level by reason of the higher current but the arc length would be reduced because of the reduced voltage.

Moreover, as regards the rectification, a multiphase rectified supply for each electrode would be preferable to the single-phase system shown but against this multiphase rectifiers tend to introduce harmonics into the supply.

I claim:

1. A direct arc furnace comprising:
   a refining vessel for receiving a steelmaking charge;
   a source of d.c.;
   at least one electrode mounted in the vessel for contact with the charge;
   a plurality of electrodes dependent into the vessel above the charge, the electrodes being symmetrically arranged around a circular path about the vertical axis of the vessel; and
   means for connecting the d.c. source between the vessel electrode on the one hand and the plurality of dependent electrodes on the other.

2. A furnace according to claim 1, wherein the dependent electrodes are connected as cathodes to the negative supply of the d.c. source.

3. A furnace according to claim 2, wherein the vessel electrode is constituted by
   a reservoir of the refined steel located in a well in the base or hearth of the vessel, and including
   an enclosed rod of metal extending from the reservoir for connection to the positive supply of the d.c. source.

4. A furnace according to claim 3, wherein the reservoir is bounded by
   a bowl-shaped depression whereby, when the vessel is tilted for tapping, the reservoir is never completely evacuated.

5. A furnace according to claim 4, wherein the rod lies in a direction parallel with the axis about which the furnace is tilted.

6. A furnace according to claim 5, wherein said d.c. source is constituted by
   a multi-phase rectifier bank whereby to provide a multi-phase rectified supply for each electrode.

7. A direct arc furnace comprising:
   a refining vessel for receiving a steelmaking charge;
   a source of d.c.;
   a plurality of massive electrodes dependent into the vessel above the charge and symmetrically arranged around a circular path about the vertical axis of the vessel;
   means for connecting the negative supply of the d.c. source in common to said plurality of electrodes;
   at least one electrode mounted in the vessel for contact with the charge; and
   means for connecting said one electrode to the positive supply of the d.c. source and wherein said one electrode is constituted by
   a reservoir of the refined steel located in a bowl-shaped depression in the wall or hearth of the vessel whereby, when the vessel is tilted for tapping, the reservoir is never completely evacuated.

* * * * *